Feb. 22, 1949.  L. B. DONOVAN  2,462,368
APPARATUS FOR PAINTING GAS HOLDERS
Filed April 12, 1946  2 Sheets-Sheet 2
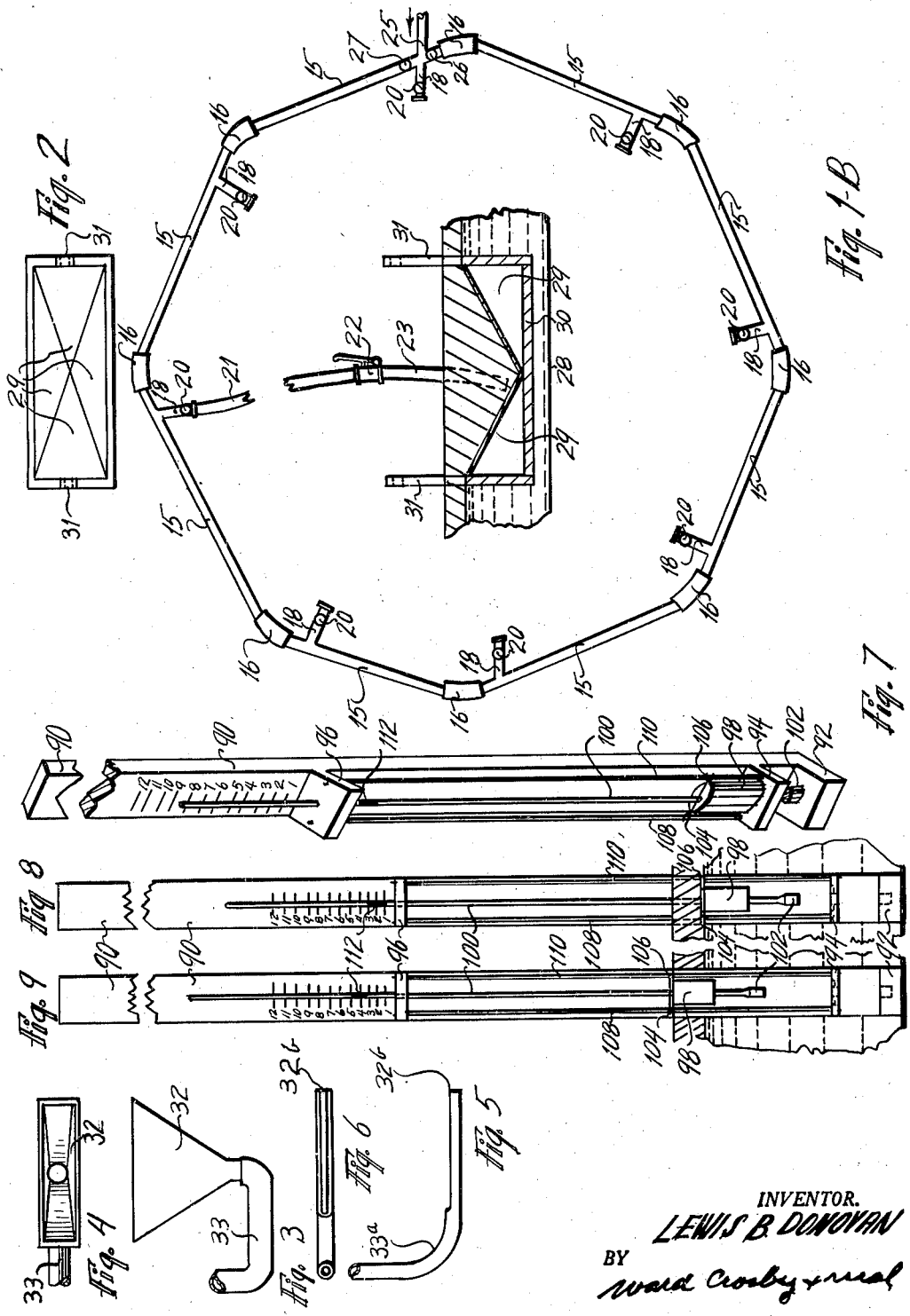
INVENTOR.
LEWIS B. DONOVAN
BY
ATTORNEYS Patented Feb. 22, 1949

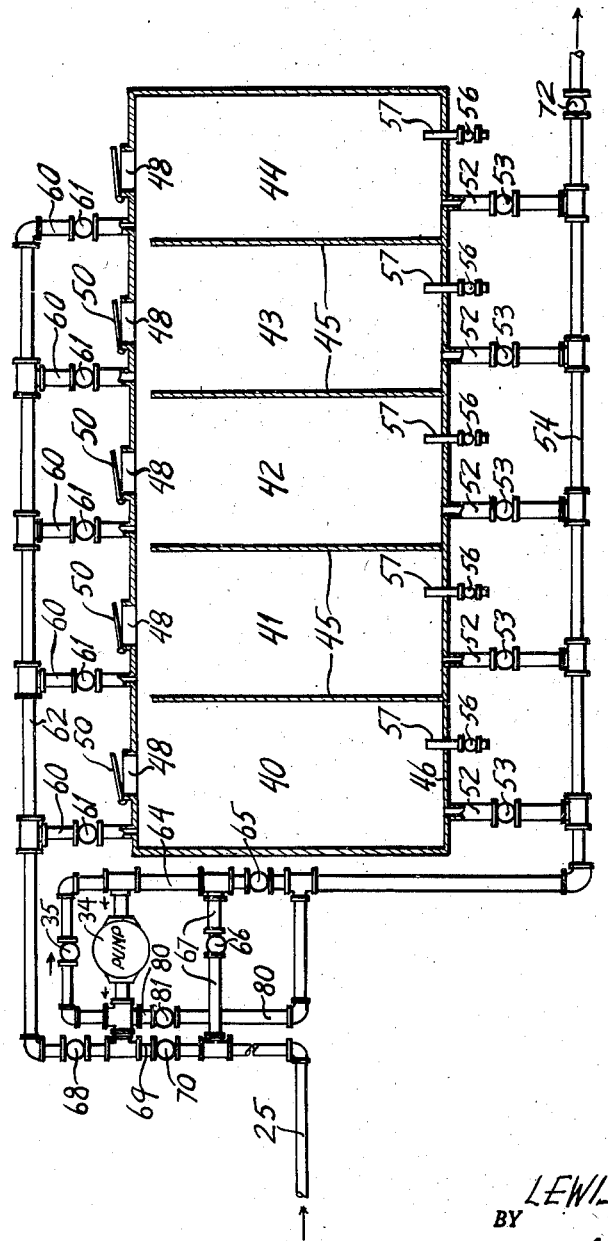

2,462,368

UNITED STATES PATENT OFFICE 2,462,368

APPARATUS FOR PAINTING GAS HOLDERS

Lewis B. Donovan, White Plains, N. Y., assignor to Consolidated Edison Company of New York, Inc., New York, N. Y., a corporation of New York Application April 12, 1946, Serial No. 661,670

3 Claims. (Cl. 91—56)

This invention relates to painting apparatus and particularly to one that is useful for supplying paint to and removing it from the water-seals of the lifts or telescoping sections of a gas-holder during the painting of the outer exposed surfaces of the latter. However, it is to be understood that the painting apparatus hereinafter described is useful for other purposes.

This application is a continuation-in-part of my application, Serial No. 585,609, filed March 30, 1945, for Painting of gas holders. (Patent No. 2,451,158, granted October 12, 1948.) In practicing the method described in that application, a layer of floating paint is delivered to the water-seal of each lift or telescoping section of a gas-holder, and then by progressively lowering and raising said telescoping sections paint is drawn first downwardly and then upwardly from said paint layers on to the surfaces of said telescoping sections; after which the surplus paint left floating on the surface of the water-seals, is removed and de-watered for subsequent use. The apparatus of the present invention is useful for practicing that method.

By the term "paint," as used in this specification and the appended claims, is meant any suitable surface coating, such as paint, drying oil, etc. The paint to be used must be suitable not only for coating the surfaces to be covered, but also for use in the apparatus of the present invention. The specific gravity of the paint employed in the apparatus hereinafter described should be less than the specific gravity of water, in order that it may float on the surface of water, for example, on the water in the water-seals which are provided at the bottom of each section of a gas-holder. For best results, a paint should be chosen having a viscosity as well as a specific gravity within certain limits, as hereinafter explained. Also, the paint used should not easily emulsify with water or, if a paint is used which does emulsify with water, it should be easily recoverable from the emulsion. In the practice of the method described in said prior application, a larger quantity of paint is required than would be used for covering the equivalent surface in ordinary ways such as by brushing or spraying; but the surplus paint may be recovered for use again by the apparatus which is the subject of the present invention. In order to secure the most desirable results, care should be taken in selecting a paint which not only has a specific gravity low enough to float on the water, but it also appears desirable to take into consideration the relationship of the specific gravity to the viscosity of the paint used. In general it appears desirable to avoid use of paints which are relatively thin and have a high specific gravity, even though the specific gravity is less than that of water. It would appear that paints having a specific gravity within the range of about 0.80 to 0.99 with a preferred gravity of about 0.91 are most satisfactory for use in the apparatus of the present invention, if so chosen that the viscosity thereof will be within a range of about 25 to 60 seconds (as measured in Consolidated Edison Company #4 Ford type cup at 70° F.). While a variety of different kinds of paint may be used, care should also be taken to select one in which the pigments and other ingredients do not tend to stratify in the paint layer within the period of time required for conducting the painting operations. Paints embodying carbon black and having gravities and viscosities within the above stated limits have been found satisfactory in the painting of gas-holders, also aluminum paints of such viscosity or other characteristics as will cause the aluminum particles to be maintained in suspension for the requisite period. Paints of various colors are also available for the purpose. Since for good results the viscosity of the paint as applied is important, and since the viscosity may be substantially higher at winter temperatures, than during the summer, it will be apparent that in selecting a paint of proper viscosity, one should take into consideration the outdoor temperature at which the paint is to be used for the purpose. As above indicated, the paint should also be one which does not readily emulsify when being pumped along with water through the particular pump used in the apparatus of this invention.

The invention will be understood from the following description, taken in connection with the accompanying drawings which illustrate apparatus embodying the invention. Fig. 1A is a sectional and partly conventional elevation showing a portion of the apparatus (which is preferably mounted on a truck to make it portable) which cooperates with distribution piping, schematically shown in Fig. 1B, adapted to be arranged around a gas-holder in position to communicate with the water-seals to and from which paint is to be delivered and removed during the painting operation, a skimming basin being represented in vertical section at the mid-portion of Fig. 1B, in its position in a water-seal during the removal of the surplus paint therefrom; Fig. 2 is a plan view of said skimming basin; Figs. 3 and 4 are respectively a side elevation and plan view of a skimming device useful for removing paint floating on the surface of water; Figs. 5 and 6 are respectively a side elevation and plan view of another form of paint-skimming device. Fig. 7 is a perspective view of a device useful for measuring the depth of the floating layer of paint on the surface of the water-seals; Fig. 8 is a front elevation of the said measuring device, represented as inserted in a water-seal, with the floating element of said device floating near the surface of the water and below the paint layer; and Fig. 9 is a front elevation, similar to Fig. 8, but after the floating element has been manually lifted until its top is at the upper surface of the paint layer.

It is desirable that the paint be distributed to the various water-seals at a plurality of points around the gas-holder, so that a floating paint layer which is substantially uniform in depth will be produced. The depth of the floating paint layer may be measured conveniently by the measuring device, illustrated in Figs. 3, 4 and 5, which is hereafter described. Also, in removing the surplus paint from the water-seals it is desirable that the removal be effected at a plurality of places in the water-seals around the gas-holder so as to facilitate the removal of the surplus paint as quickly and thoroughly as possible. To these ends, distribution piping may be arranged around the gas-holder slightly above or below the level at which the treatment of the water-seals is to take place, that is, slightly above or below the elevation of the surface of the water contained in the holder tank or pit.

An example of such distribution piping is illustrated in Fig. 1B. Such piping and its arrangement may of course be varied, depending upon the form and dimensions of the gas-holder which is being painted. In this figure, the distribution piping is shown as comprising pipes 15 connected to one another at their ends by quick-detachable and flexible connections 16 of any suitable and well-known type, and branch pipes 18, each containing a valve 20 for controlling the flow of paint through that pipe. To these branch pipes 18 is connected a hose 21 to the end of which is attached a manually controllable valve 22, of any suitable and well-known kind, carrying a discharge nozzle 23. Although Fig. 1B shows only one hose 21 and its associated valve 22 and nozzle 23, it will be understood that any number of these may be attached to the branch pipes 20, for the supplying and withdrawing of paint from a water-seal during the painting operation. Thus, a paint layer having a substantially uniform depth may be applied to a water-seal and the surplus paint may be withdrawn from the latter. One of the pipes 15 is provided with a feed pipe 25 leading to the apparatus (shown in Fig. 1A and hereinafter described) by which the paint is supplied to and withdrawn from the water-seals. Valves 26 and 27, in one of the pipes 15 on each side of pipe 25, facilitate the control of the feeding and withdrawal of the paint.

In withdrawing surplus paint from the water-seal, it is desirable, so far as possible, to avoid withdrawing water along with the paint. That may be accomplished by using a skimming basin 28, an example of which is shown in Figs. 1B and 2. This skimming basin 28 may be in the form of a box having such displacement characteristics that it will sink in paint but float in water with its top edge projecting slightly above the water surface. As shown in Figs. 1B and 2, this skimming basin or box 28 is provided with sloping bottom sections 29 so as to provide a low point from which paint may readily be withdrawn. The box may be weighted, so that it will float in water with its top edge projecting slightly above the water surface, by applying to the bottom of the box a metal plate indicated at 30; and, to facilitate handling, the box is provided with upwardly projecting handles 31. When the skimming basin 28 is lowered into a water-seal in which the surface of the water is covered with a paint layer, the skimming basin sinks out of sight through the paint layer and floats in the water with the top edge of the basin slightly projecting above the water-paint interface. Paint flows into the skimming basin 28 and may be withdrawn therefrom through the nozzle 23, valve 22, hose 21 and the distribution piping, under the influence of the suction produced by the apparatus, shown in Fig. 1A, which is hereafter described. During the skimming operation, the workman who is manipulating the hose 21 carrying the nozzle 23 and controlling the valve 22 may tip the skimming basin 28 slightly, as the skimming operation nears completion, so as to facilitate the flow of paint into the skimming basin; and of course the skimimng basin may be moved from one position to another in the water-seal from which paint is being removed. The handles 31 attached to the skimming basin, not only facilitate the handling of it, but also indicate to the manipulator of the nozzle 23 the place where the skimming basin lies submerged below the floating paint layer.

Instead of employing the skimming basin 28, the skimming devices shown in Figs. 3 and 4 or in Figs. 5 and 6 may be used. These skimming devices are adapted to be substituted for the nozzle 23 attached to the valve 22 at the end of the hose 21. The skimming device shown in Figs. 3 and 4 comprises a funnel portion 32 attached to a pipe 33; and the skimming device shown in Figs. 5 and 6 comprises a bent pipe 33—a having its horizontal portion formed with a slot 32—b. When either of these skimming devices is attached to a valve 22 on the end of a hose 21, it is an easy matter for the operator to submerge the paint gathering portions 32 or 32b just below the surface of the floating paint and gather it into the skimming device under the influence of the suction applied to it by the apparatus about to be described.

Fig. 1A shows a form of apparatus useful for supplying paint through the pipe 25 to the distribution piping, hoses 21 and nozzles 23, and for removing the surplus paint and for de-watering it. As hereinbefore mentioned, this apparatus is preferably mounted on a truck so as to be readily portable. As shown in Fig. 1A, the apparatus includes a pump diagrammatically indicated at 34 which may be driven from any convenient source of power. In order to provide continuous pressure or suction on the distribution lines under all conditions, a by-pass is provided around the pump 34 as shown, containing a relief valve 35, of any well known form, which permits the flow of paint through the by-pass only when the pressure exerted by the pump exceeds a certain amount. The directions of flow through the pump 34 and through the by-pass are indicated by arrows. Associated with the pump 34, is a paint holding tank divided into sections 40, 41, 42, 43 and 44 by partitions 45 upwardly extending from the tank bottom 46 nearly to the top of the tank, as shown in the drawing. In the top of the tank above each tank section, is an opening 48 having a cover 50, through which paint may be introduced into the tank section. As shown in Fig. 1A, the bottom of each tank section 40, 41, 42, 43 and 44 is connected, by a pipe 52 containing a valve 53, to a common pipe or bottom header 54. The bottom of each tank section is also provided with a test valve 56 in a pipe 57 which communicates with the tank section, for purposes hereinafter described. The top of each tank section 40, 41, 42, 43 and 44 is connected by a pipe 60, containing a valve 61, to a common pipe or top header 62. As will be obvious from Fig. 1A, the intake side of the pump 34 is connected with the bottom header 54 through a pipe 64 and a valve 65; and that the intake side of the pump is also connected with the pipe 25 leading to the distribution piping shown in Fig. 1B, through a pipe 67 containing a valve 66. It will also be noted that the outlet side of the pump 34 is connected with the top header 62 through a valve 68; and that the outlet side of the pump 34 is also connected to the distribution pipe 25 through a pipe 69 and a valve 70.

The manner in which the several valves may be manipulated, so as to selectively control the pumping of paint from the bottom of any tank section 40, 41, 42, 43 and 44 to the distribution pipe 25, or from the distribution pipe 25 to the top of any tank section, or from the bottom of any tank section to the top of any tank section, will now be described.

Let it be assumed that paint has been introduced into one or more of the tank sections 40, 41, 42, 43 and 44 preparatory to the painting of the various sections of a gas-holder in the manner hereinbefore described. Let it also be assumed that the distribution piping and hoses 21 have been suitably arranged around the gas-holder and ready to deliver paint to a water-seal. The outlet side of the pump 34 is connected to the pipe 25 by the opening of the valve 70; the valve 68 is closed in order to shut off connection of the pump 34 with the top header 62; the intake side of the pump 34 is connected to the bottom header 54 by opening the valve 65; the valve 66 is closed in order to cut off the intake side of the pump 34 from connection with the pipe 25; and the valve 72 near the end of the bottom header 54 is closed, as is also a valve 81 which is provided in the pipe 80 for a purpose later explained. Opening of any one or more of the valves 53 will permit paint to flow from any one or more of the tank sections 40, 41, 42, 43 and 44 into the bottom header 54. Therefore, with the valves set in the manner just described, the pump 34 will draw paint from any one or more of the tank sections, through one or more of the pipes 52 connecting with the bottom header 54, the valve 65 and the pipe 64; and the pump will force paint from its outlet side, through the pipe 69 and valve 70, to the pipe 25 leading to the distribution piping arranged around the gas-holder. Obviously, the supply of paint to the distribution piping may be controlled both by the valves 26 and 27 in the distribution piping, and by the valve 70 which is part of the apparatus shown in Fig. 1A. Regardless of how these valves may be manipulated, stalling of the pump 34 is prevented by the relief valve 35.

Let it now be assumed that the painting of a gas-holder section has been completed, and that it is desired to withdraw the surplus paint from the water-seal using the skimming devices which have been described. The valves 65, 70 and 81 are closed and the valve 66 is opened, thereby connecting the intake side of the pump 34 (through the pipe 64, valve 66 and pipe 67) with the pipe 25 leading to the distribution piping; and the valve 68 and any one or more of the valves 61 are opened, thereby connecting the outlet side of the pump (through the valve 68, top header 62, pipe or pipes 60 and valve or valves 61) to the top of one or more of the tank sections 40, 41, 42, 43 and 44. Under these conditions, the pump 34 when operated draws paint from the surface of the water-seal through one or more of the hoses 21 and the distribution piping, pipe 25, pipe 67, open valve 66 and pipe 64, and delivers this paint (through the open valve 68 and top header 62) to one or more of the tank sections through the pipe or pipes 60 in which the valve or valves 61 are open. This operation of removing surplus paint from the water-seal is principally controlled by manipulation of the valves 22 in the holes 21.

In the withdrawing of surplus paint from the water-seals, some water is likely also to be withdrawn and left mingled with the paint in one or more of the tank sections. The manner in which the apparatus shown in Fig. 1A may be used for the storage and de-watering of such paint will now be described. Let it be assumed that enough paint and water have been withdrawn from a water-seal into the tank sections 40 and 41 to fill them about three-quarters full, and let it also be assumed that the tank sections 42, 43 and 44 are empty. The paint and water in the tank sections 40 and 41 will stratify into a top paint-layer and a bottom water-layer, since the paint is of less specific gravity than the water and does not emulsify with the water. The existence of the bottom water-layers can be proved by opening the test valves 56 in the pipes 57 extending into the bottoms of the tank sections. If it is permissible to discharge water from the tank sections at the place where the truck carrying the apparatus shown in Fig. 1A is located, the water in the bottom layers in tank sections 40 and 41 may be drained out through the pipes 52, valves 53, bottom header pipe 54 and the valve 72; valves 65 and 81, and the valves 53 beneath tank sections 42, 43 and 44 being closed during this operation. If, however, it is not permissible to discharge the water in the bottom layers in tank sections 40 and 41, that water may be pumped from those sections into empty tank section 44 where it may be temporarily stored. During this water-pumping operation, the valves 53 beneath the tank sections 40 and 41 are open, and the valves 53 beneath the tank sections 42, 43 and 44 and valve 72 are closed; valve 65 is open; valves 66, 70 and 81 are closed; valve 68 is open; and all of the valves 61 above the various tank sections are closed, except valve 61 above tank section 44 which is open.

Instead of the procedures just described, all of the water and paint in section 40 may be pumped out of that section into tank section 41, thereby not only filling that section 41 but causing floating paint to flow from that section 41 into section 42 over the top of the partition 45 between those sections, thereby separating paint from the water.

In some cases it may be preferred to pump the surplus paint from pipe 25 into the bottom of one or more of the tank sections instead of into the tops of the tank sections as above described. For this purpose, pipe 80 containing valve 81 is provided for inter-connecting the outlet side of the pump 34 to the header pipe 54. When it is desired to use the pipe 80 in this way, valves 65, 68 and 70 are closed and valves 66 and 81 opened. Then, with the pump operating, paint will be drawn from pipe 25 through valve 66 in pipe 67, through the pump 34, and forced through valve 81 in pipe 80 into header pipe 54, thence through any of the valves 53 as desired, into the bottom portion of one or more of the tank sections. In these and other ways, the paint and water may be separated, and stored in the various tank sections. When, however, it is possible to discharge the water at the place where the apparatus shown in Fig. 1A is located, that procedure is preferable to the pumping of water from one tank section to another. It will be obvious, also, that the apparatus shown in Fig. 1A permits the pumping of paint from any tank section to any other tank section.

The device shown in Figs. 7, 8 and 9, for measuring the depth of a paint layer floating on water, as in the water-seal of a gas holder, will now be described. As shown, this device has a frame comprising a back member 90, to one side of which are secured projecting shelves 92, 94 and 96. Supported by this frame is an indicating element comprising a float member 98 secured to a rod 100 which extends upwardly from the float member and slides freely in a hole in the shelf 96; a weight or sinker 102 being attached to the bottom of said float member 98 and adapted to pass freely through a hole in the shell 94. In order to guide the float member 98 in its movement between the shelves 94 and 96, the float member is provided with projecting members 104 and 106 which cooperate with wires 108 and 110 secured at their ends to the shelves 94 and 96. The rod 100 is provided with a marking 112 at such a location that said marking cooperates (as hereinafter explained) with a scale, preferably in inches, marked on the back member 90 as shown in Figs. 7, 8 and 9. The weight of the sinker 102 is such that the float member 98 will float in water with its top slightly emerging from the surface of the water, for purposes which will become apparent from the following description of the way in which the measuring device is used. Fig. 8 is intended to show said measuring device extending downwardly into the water-seal of a gas holder and resting on the bottom thereof. Owing to the buoyancy of the float member 98, as above described, the float member floats in the water with its top slightly projecting above the surface of the water and into the paint layer. A reading is then taken of the position of the top of the marking 112 on the scale; and the user of the measuring device, while holding the back member 90 with one hand, pulls the rod 100 upwardly until the top of the float member 98 is barely visible above the upper surface of the paint layer, whereupon another reading is taken of the position of the top of the marking 112 on the scale. The difference between these two readings is the depth of the paint layer.

I wish it to be understood that I do not desire to be limited to the exact details of construction shown and described, for obvious modifications will occur to a person skilled in the art.

What is claimed as new and desired to be secured by Letters Patent is:

1. Apparatus useful in painting, comprising distribution piping extending to places where a floating layer of paint is to be delivered to and removed from the surface of water, a pump, a paint-holding tank divided into sections by partitions extending upwardly from the bottom of the tank nearly to the top thereof, piping connecting the intake side of said pump with each of said tank sections and with said distribution piping, piping connecting the outlet side of said pump with each of said tank sections and with said distribution piping, and valves in said pipings selectively controlling the pumping of paint from the bottom of any tank section to the distribution piping, from the distribution piping to any tank section and from any tank section to any other tank section.

2. Apparatus for use in painting, comprising in combination, distribution piping extending into places where a flowing layer of paint is to be delivered to and removed from the surface of water, a paint holding tank, pumping means interconnecting said tank and piping, valve means for selectively controlling the pumping of paint from said tank to the distribution piping and from such piping back to the tank, a skimming basin adapted to sink through the paint layer on the water and to float in the water with the edge of said basin projecting slightly above the water-paint interface, said piping including a nozzle adapted to be inserted in said skimming basin so as to cause the paint in said basin to be removed through said piping during pumping of paint back to said tank.

3. Apparatus for painting gas holders of the type having water seals surrounding the holder at regions between sections, comprising distribution piping constructed and arranged to be placed in position around the gas holder and adjacent a water seal thereof, said piping having outlets at spaced points where a floating layer of paint is to be delivered to and removed from the surface of the water of said seals, a paint holding tank, pumping means and connections for interconnecting said tank and distribution piping, valves in said connections selectively controlling the pumping of paint from said tank to the distribution piping and from the distribution piping back to said tank, skimming means at said outlets constructed and arranged to cause paint to be withdrawn from the surface of the water during the latter operation of the pumping means, said tank and connections including means enabling pumping of paint separated from water from said tank.

LEWIS B. DONOVAN.

REFERENCES CITED

The following references are of record in the file of this patent:

UNITED STATES PATENTS

| Number | Name | Date |
| --- | --- | --- |
| 353,775 | Booraem | Dec. 7, 1886 |
| 418,984 | Parks, Jr. | Jan. 7, 1890 |
| 824,973 | Braznell | July 3, 1906 |
| 1,450,545 | Hans | Apr. 3, 1923 |
| 1,604,230 | Latimer | Oct. 26, 1926 |